United States Patent
Kometani et al.

[11] Patent Number: 5,805,773
[45] Date of Patent: Sep. 8, 1998

[54] FUZZY REASONING METHOD AND SYSTEM

[75] Inventors: Naohisa Kometani; Koichi Ueno, both of Yokohama; Koji Echigo, Shinminato, all of Japan

[73] Assignees: Hitachi Ltd.; Hitachi Software Engineering Co. Ltd., both of Tokyo, Japan

[21] Appl. No.: 796,310

[22] Filed: Nov. 22, 1991

[30] Foreign Application Priority Data

Nov. 28, 1990 [JP] Japan ................................. 2-322722

[51] Int. Cl.⁶ ................................................ G06G 7/00
[52] U.S. Cl. .................................. 395/3; 395/61; 395/900
[58] Field of Search .................... 395/61, 900, 3

[56] References Cited

U.S. PATENT DOCUMENTS

| | | | |
|---|---|---|---|
| 4,864,490 | 9/1989 | Nomoto et al. | 395/61 |
| 5,001,640 | 3/1991 | Matsumoto et al. | 395/900 |
| 5,018,689 | 5/1991 | Yasunobu et al. | 395/900 |
| 5,022,498 | 6/1991 | Sasaki et al. | 395/61 |
| 5,043,862 | 8/1991 | Takahashi et al. | 395/900 |
| 5,067,374 | 11/1991 | Sakai et al. | 395/900 |
| 5,084,754 | 1/1992 | Tumitaka | 395/900 |
| 5,138,846 | 8/1992 | Ogawa et al. | 395/900 |
| 5,146,898 | 9/1992 | Itakura et al. | 395/900 |
| 5,153,822 | 10/1992 | Yubazaki et al. | 395/900 |
| 5,175,795 | 12/1992 | Tsuda et al. | 395/3 |

OTHER PUBLICATIONS

Y. Dote et al, "Fuzzy Learning Grasping . . . Manipulator Hand", IEEE, vol. II, Nov. 1990, pp. 1295–1265.
A. Kamet et al, "MCFS: A Multiple Criteria . . . Systems Building Tool" IEEE, Oct. 1990, pp. 605–610.
"Manual of Hitachi Creative Work Station ES/KERNEL/W" issued by Hitachi, Ltd., pp. 191–197.

*Primary Examiner*—Tariq R. Hafiz
*Attorney, Agent, or Firm*—Meltzer, Lippe Goldstein, Wolf & Schlissel, P.C.

[57] ABSTRACT

A fuzzy reasoning system separately manages fuzzy rule groups, and fuzzy sets each including a plurality of membership functions. When executing fuzzy reasoning, the system selects one fuzzy rule group and at least one fuzzy set in conformity with a situation at that time and combines them. Thereafter, it executes the reasoning for fact information. This arrangement facilitates the building of a flexible fuzzy reasoning system which can confirm to varying situations. In another aspect, the separate management of the fuzzy rule groups and the fuzzy sets allows the selection of only any desired membership function of the fuzzy set to obtain a grade of membership based on the fact information.

6 Claims, 7 Drawing Sheets

FIG.2(a)

| RULE IDENTIFIER (21) | CONDITION PART EXPRESSION (22) | CONCLUSION PART EXPRESSION (23) |
|---|---|---|
| $R_1$ | $M_1$ and $M_4$ | $M_6$ |
| $R_2$ | $M_2$ or $M_5$ | $M_7$ |
| $R_3$ | $M_3$ and $M_5$ | $M_8$ |

| PROPOSITION NO. (24) | SUBJECT (25) | PREDICATE (26) |
|---|---|---|
| $M_1$ | $S_1$ | $P_1$ |
| $M_2$ | $S_1$ | $P_2$ |
| $M_3$ | $S_1$ | $P_3$ |
| $M_4$ | $S_2$ | $P_2$ |
| $M_5$ | $S_2$ | $P_4$ |
| $M_6$ | $S_3$ | $P_5$ |
| $M_7$ | $S_3$ | $P_2$ |
| $M_8$ | $S_3$ | $P_6$ |

FIG.2(b)

FUZZY RULE GROUP #1

$R_1$: IF    $S_1$ is $P_1$, and
            $S_2$ is $P_2$,
     THEN   set $S_3$ at $P_5$.

$R_2$: IF    $S_1$ is $P_2$, or
            $S_2$ is $P_4$,
     THEN   set $S_3$ at $P_2$.

$R_3$: IF    $S_1$ is $P_3$, and
            $S_2$ is $P_4$,
     THEN   set $S_3$ at $P_6$.

| PROPOSITION NO. | SUBJECT | PREDICATE | DOMAIN | FUNCTION TYPE | PARAMETER |
|---|---|---|---|---|---|
| $M_1$ | $S_1$ | $P_1$ | $D_1$ | $T_1$ | $O_1$ |
| $M_2$ | $S_1$ | $P_2$ | $D_1$ | $T_2$ | $O_2$ |
| $M_3$ | $S_1$ | $P_3$ | $D_1$ | $T_3$ | $O_3$ |
| $M_4$ | $S_2$ | $P_2$ | $D_2$ | $T_4$ | $O_4$ |
| $M_5$ | $S_2$ | $P_4$ | $D_2$ | $T_5$ | $O_5$ |
| $M_6$ | $S_3$ | $P_5$ | $D_3$ | $T_6$ | $O_6$ |
| $M_7$ | $S_3$ | $P_2$ | $D_3$ | $T_7$ | $O_7$ |
| $M_8$ | $S_3$ | $P_6$ | $D_3$ | $T_8$ | $O_8$ |

FIG. 4

| RULE IDENTIFIER −21 | CONDITION PART EXPRESSION −22 | CONCLUSION PART EXPRESSION −23 |
|---|---|---|
| $R_1$ | $M_1$ and $M_4$ | $M_6$ |
| $R_2$ | $M_2$ or $M_5$ | $M_7$ |
| $R_3$ | $M_3$ and $M_5$ | $M_8$ |

| PROPOSITION NO. −31 | SUBJECT −32 | PREDICATE −33 | DOMAIN −34 | FUNCTION TYPE −35 | PARAMETER −36 |
|---|---|---|---|---|---|
| $M_1$ | $S_1$ | $P_1$ | $D_1$ | $T_1$ | $O_1$ |
| $M_2$ | $S_1$ | $P_2$ | $D_1$ | $T_2$ | $O_2$ |
| $M_3$ | $S_1$ | $P_3$ | $D_1$ | $T_3$ | $O_3$ |
| $M_4$ | $S_2$ | $P_2$ | $D_2$ | $T_4$ | $O_4$ |
| $M_5$ | $S_2$ | $P_4$ | $D_2$ | $T_5$ | $O_5$ |
| $M_6$ | $S_3$ | $P_5$ | $D_3$ | $T_6$ | $O_6$ |
| $M_7$ | $S_3$ | $P_2$ | $D_3$ | $T_7$ | $O_7$ |
| $M_8$ | $S_3$ | $P_6$ | $D_3$ | $T_8$ | $O_8$ |

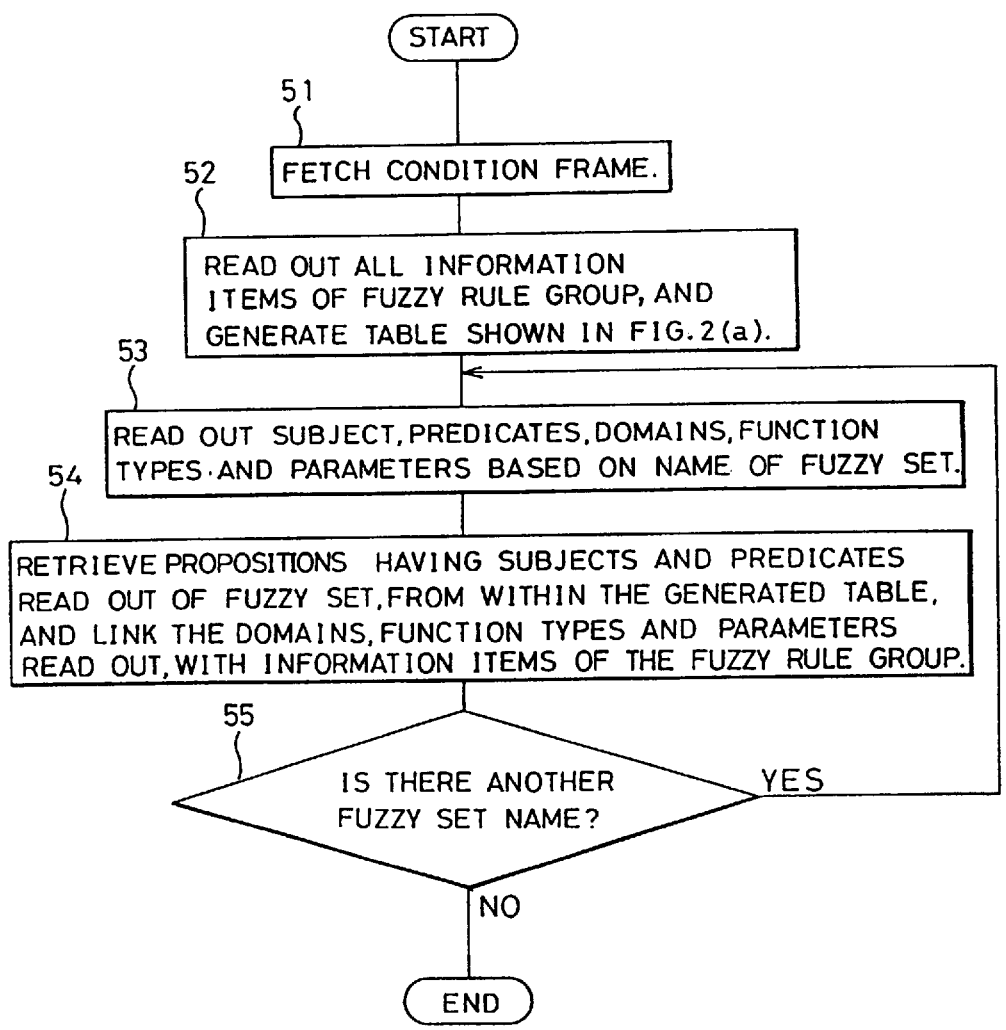

FUZZY REASONING METHOD AND SYSTEM

BACKGROUND OF THE INVENTION

1. Field of the Invention

The present invention relates to fuzzy reasoning or fuzzy inference in the fields of business transactions including financial business, the fields of control technology concerning machine controls, and so forth.

2. Description of the Related Art

The fuzzy theory is a theory which deals with fuzziness mathematically. It is fuzzy reasoning that realizes facts from ambiguous knowledge through the fuzzy theory. By way of example, let's consider a case where, in developing an automatic drive system for an automobile, the working of a brake is to be expressed as knowledge items. In this case, with so called forward reasoning, it is required to make rules for individual knowledge items such as "IF the distance between cars is x1 meters, and the running speed of the particular car concerned is Y1 kilometers per hour, THEN the frictional force of the brake is set at Z1.", . . . , and "IF the distance is xn meters, and the running speed is Yn kilometers per hour, THEN the frictional force is set at zn.", and to teach these rules to the system. Accordingly, the number of rules becomes very large.

In contrast, when fuzzy reasoning is utilized, knowledge items can be described in natural expressions such as "IF the distance between cars is not very long, and the particular car concerned is running at high speed, THEN the brake is operated quickly.", and "IF the distance is sufficient, and the particular car is running at low speed, THEN the brake is operated lightly." The knowledge items in such expressions are called "fuzzy rules". The ambiguous expressions of "not very", "high speed", "operated quickly", etc. are defined by mathematical functions called "membership functions".

Heretofore, the rules and membership functions of fuzzy reasoning or fuzzy inference have been handled as unitary information items as stated in "Manual of Hitachi Creative Work Station 2050 ES/KERNEL/W" issued by Hitachi, Ltd., pp. 191–197. It has therefore been difficult to build a system, such as monetary system, in which the shapes of the membership functions change temporarily. Also, on account of the unitary information items, it has been difficult to build a system in which only the grade of membership is acquired using the membership functions, typically as in the fields of control technology.

According to the prior-art technique mentioned above, the fuzzy rules and the membership functions are statically and correspondingly defined within one pack of source knowledge in tools which build the fuzzy reasoning system. This poses the problem that when a situation in making the reasoning has changed, the produced system fails to conform to the new situation, or that the system cannot conform to a plurality of situations. In such a case, it is necessary to reproduce the system or to produce a plurality of systems. It is accordingly very difficult to cope with various situations. Moreover, as stated above, it is next to impossible that only the grade of membership is obtained using the membership functions on the basis of production rules.

SUMMARY OF THE INVETION

An object of the present invention is to build a fuzzy reasoning system which can conform to varying situations. Another object of the present invention is to build a fuzzy reasoning system in which only the grade of membership can be obtained using membership functions on the basis of production rules.

An expedient for accomplishing the objects consists in that fuzzy rule information and membership function information are separately managed and are dynamically linked to each other at the time of execution of reasoning.

The fuzzy rule information comprises sets of rules each of which expresses knowledge in the form of "IF - THEN", and they shall be called "fuzzy rule groups" hereinafter. On the other hand, the membership function information comprises sets of membership functions each of which expresses ambiguity, and they shall be called "fuzzy sets" hereinafter.

In the first aspect of the present invention, a plurality of fuzzy sets conforming to the sorts of situation are prepared in correspondence with one fuzzy rule group beforehand, whereby the fuzzy set to be used can be dynamically altered at the time of execution of reasoning.

In the second aspect of the invention, the name of at least one fuzzy set to be used, and fact values, are designated in a condition frame on the basis of production rules, whereby the grade of membership can be referred to.

One fuzzy rule group consists of one or more fuzzy rules, each of which has one or more condition part propositions and one conclusion part proposition. One fuzzy set includes one or more propositions, and it is organized in the form in which one membership function is defined in correspondence with each proposition. One fuzzy reasoning system can be established by at least one rule group and at least one fuzzy set, and it is called out by a production system which includes a file for the production rules. Therefore, the fuzzy sets conforming to the sorts of presupposable situations and the fuzzy sets to be utilized independently on the basis of the production rules are respectively defined in advance, whereupon at the time of reasoning execution, they are properly used in accordance with the situation and purpose at that time.

BRIEF DESCRIPTION OF THE DRAWINGS

FIGS. 2(a) and 2(b) are diagrams showing an example of fuzzy rule group information;

FIG. 4 is a diagram showing an example in which the fuzzy set information is linked to the fuzzy rule group information;

FIG. 5 is a flow chart showing the flow of processing which is executed by a fuzzy reasoning initialization unit included in the system;

DETAILED DESCRIPTION OF THE PREFERRED EMBODIMENT

Figure 1:
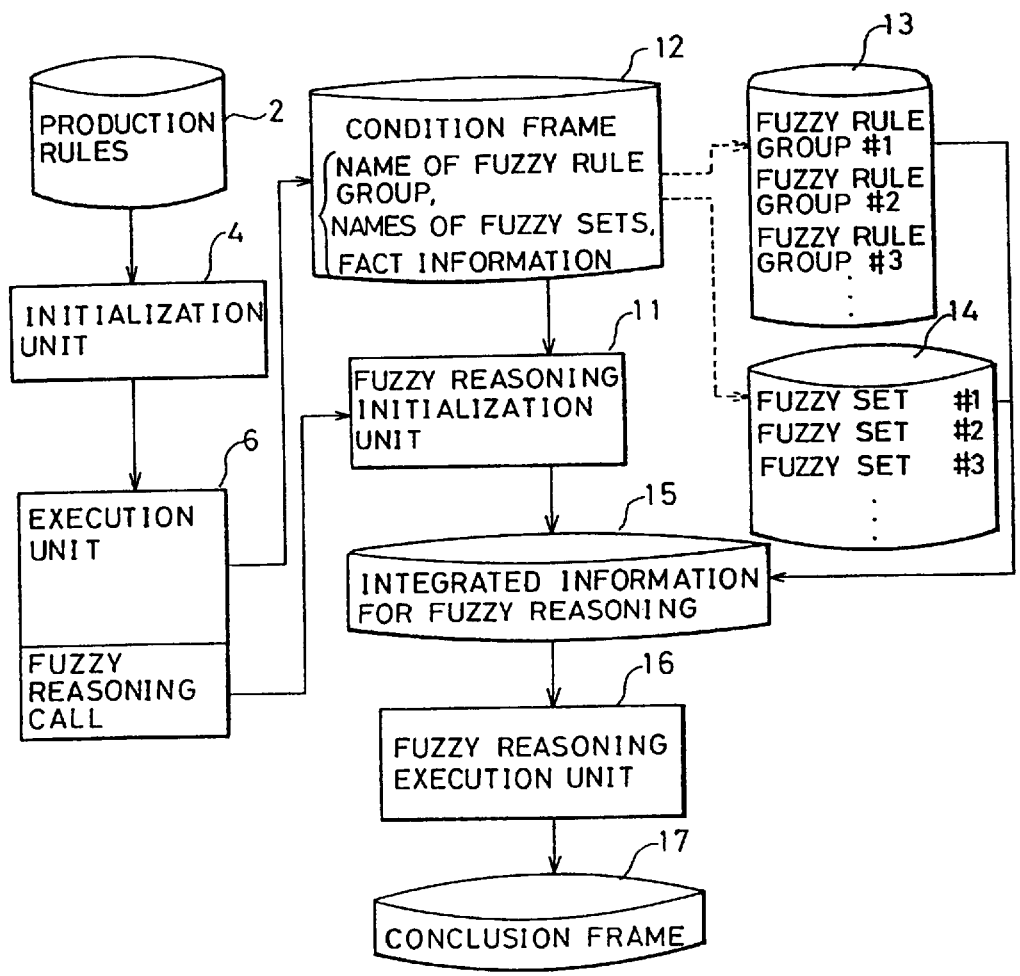
FIG. 1 is an architectural diagram showing the outline of a fuzzy reasoning system in an embodiment of the present invention.

FIG. 1 shows the schematic architecture of a fuzzy reasoning system according to the present invention.

In building the fuzzy reasoning system, a plurality of fuzzy rule groups conforming to the changes of situations are prepared and stored in a file 13. As well as these, a plurality of fuzzy sets conforming to the changes of situation are prepared for each of the fuzzy rule groups and are stored in a file 14. On the other hand, production rules which determine one of the fuzzy rule groups to-be selected in accordance with a situation at the time of execution of reasoning, and one or more fuzzy sets to be selected in correspondence with the selected fuzzy rule group, are stored in a file 2. By the way, in a case where fuzzy rules need not be altered in conformity with the situation changes, one fuzzy rule group may well be singularly used. In this case, only the fuzzy sets are selected. The production rules are described in the form of IF - THEN rules. The file 2 for storing the production rules constitutes a production system, together with an initialization unit 4 and an execution unit 6. The initialization unit 4 determines the production rule which ought to be executed first, while the execution unit 6 sets data in a condition frame 12 to be stated below and activates the fuzzy reasoning by issuing a fuzzy reasoning call. The fuzzy reasoning system is further equipped with a fuzzy reasoning initialization unit 11 and a fuzzy reasoning execution unit 16.

The name or No. of the fuzzy rule group to be applied at the time of execution of reasoning, and the name or No. of at least one fuzzy set conforming to the situation at that time are set in the condition frame 12 by the production system or manually by means of a keyboard or the like. Also, fact information at that time is set in the condition frame 12. the fact information comprises actual values concerning the propositions of the condition part of each fuzzy rule.

In the aforementioned example, the actual values of "the distance between cars" and "the running speed" at the time of execution of reasoning are the fact information.

The fuzzy reasoning initialization unit 11 finds the locations of a fuzzy rule group and a fuzzy set in the files 13 and 14 based on the name or No. of the fuzzy rule group and that of the fuzzy set designated in the condition frame 12. Subsequently, it reads the information items of the fuzzy rule group and those of the fuzzy set out of the respective files 13 and 14, and it links or combines the information items of both the fuzzy rule group and the fuzzy set, thereby generating integrated information for fuzzy reasoning as indicated in the form of a file 15.

The fuzzy reasoning execution unit 16 makes the fuzzy reasoning on the basis of the integrated fuzzy reasoning information 15 and the fact information set in the condition frame 12, and delivers a reasoned result to a conclusion frame 17.

Meanwhile, in the case where the reasoning is executed by selecting only the information items of at least one fuzzy set on the basis of the production rules, the fuzzy reasoning initialization unit 11 finds the location of a fuzzy set in the file 14 based on the name or No. of the fuzzy set designated in the condition frame 12, and it reads the fuzzy set information items out of the file 14. In this case, the fuzzy reasoning execution unit 16 executes computation processing for a membership function on the basis of the fact information items set in the condition frame 12 and the fuzzy set information items read out, and it delivers a processed result to the conclusion frame 17.

FIGS. 2(*a*) and 2(*b*) show an example of the information of one fuzzy rule group #1 stored in the file 13. The fuzzy rule group is organized of names 21 of rules constituting this fuzzy rule group, condition part expressions 22 of the respective rules, and conclusion part expressions 23 of the respective rules. Further, each of the condition part expressions 22 or each of the conclusion part expressions 23 is made up of proposition Nos. indicated at numeral 24 and an operator such as "and" or "or". In the illustrated example, however, none of the conclusion part expressions 23 contains an operator. Each proposition with the proposition No. 24 has a subject 25 and a predicate 26.

Incidentally, the information items of the fuzzy rule group shown in FIG. 2(*a*) have been obtained in such a way that the fuzzy rule group #1 27 shown in FIG. 2(*b*) is converted into the form which facilitates the execution of the fuzzy reasoning.

Figures 3A, 3B:
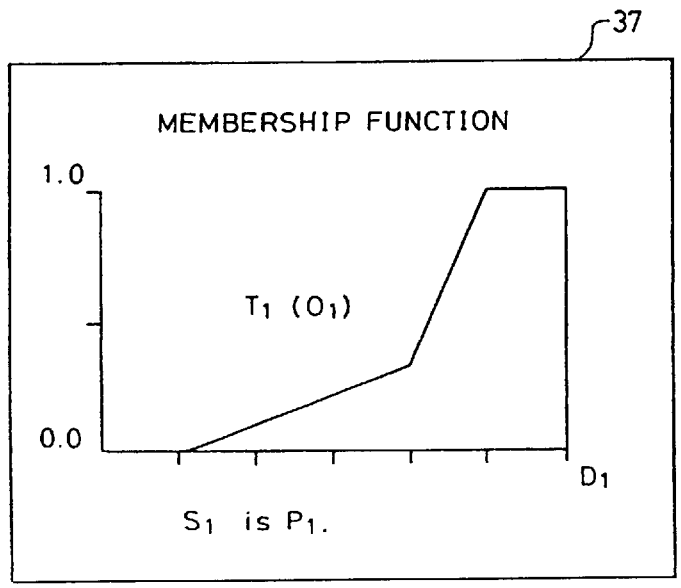
FIGS. 3(a) and 3(b) are diagrams showing an example of fuzzy set information.

FIGS. 3(*a*) and 3(*b*) show an example of the information of one fuzzy set #1 stored in the file 14. The fuzzy set consists of those Nos. of propositions which are indicated at numeral 31, subjects 32 and predicates 33 which are the constituents of the propositions, domains 34 in which membership functions are formed, function types 35, and parameters 36.

Figure 6:
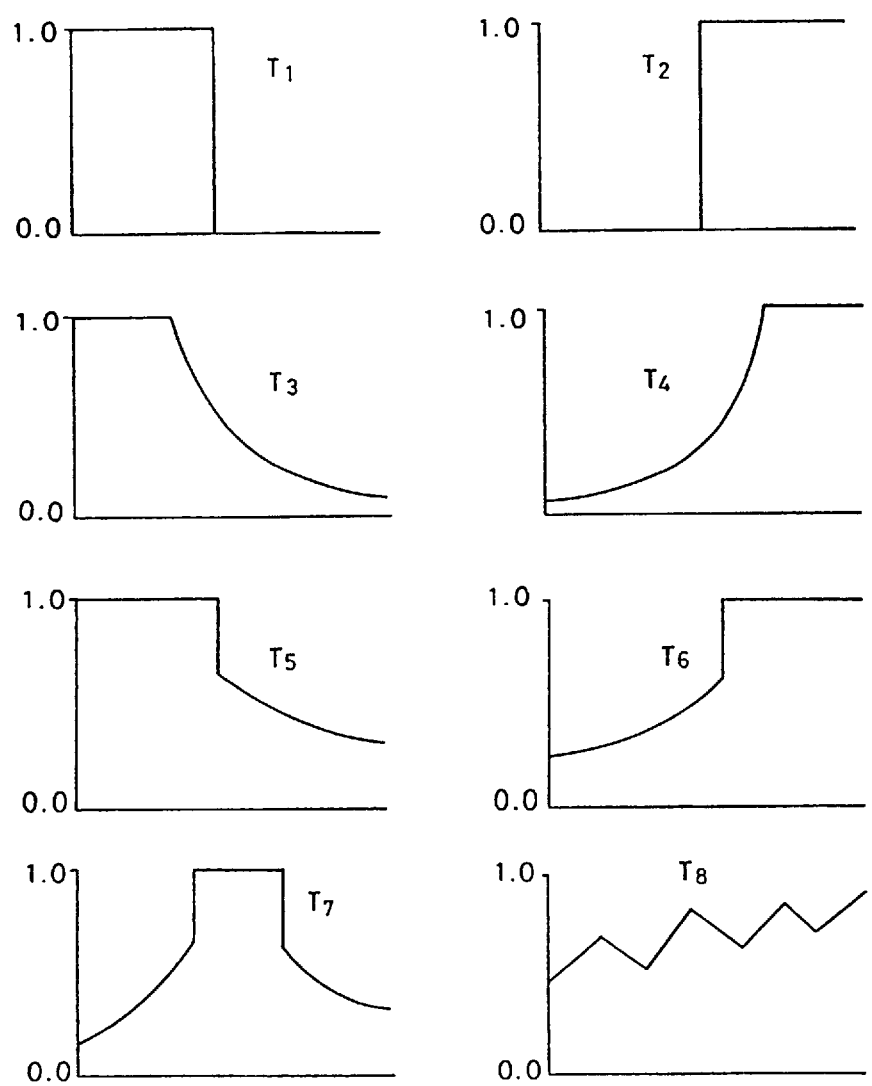
FIG. 6 shows graphs illustrative of the function types of membership functions.

As examples of the function types 35, eight types T1–T8 are graphically shown in FIG. 6. Any of the graphs has one or more parameters for determining an inflectional position or a curvature. Regarding the type T8, up to 99 inflectional points can be designated, and substantially free curves can be defined.

The information items of the fuzzy set shown in FIG. 3(*a*) have been obtained in such a way that the fuzzy set #1 consisting of a set of membership functions as exemplified at numeral 37 in FIG. 3(*b*) is converted into the form which facilitates the execution of the fuzzy reasoning.

FIG. 5 is a flow chart of processing by the fuzzy reasoning initialization unit 11. At a step 51, the condition frame 12 is fetched to obtain the name of the fuzzy rule group to be applied, the name of at least one fuzzy set to be applied, and the fact information. At a step 52, the unit 11 reads all the information items of the fuzzy rule group out of the file 13, designated by the fuzzy rule group name obtained at the step 51, and it generates a table as shown in FIG. 2(*a*). At a step 53, the unit 11 reads the subjects, predicates, domains, function types and parameters of the fuzzy set out of the file 14, designated by the fuzzy set name obtained at the step 51. At a step 54, propositions having the subjects and predicates read out are retrieved from within the table generated at the step 52, and the domains, function types and parameters of the fuzzy set are linked to the fuzzy rules of the fuzzy rule group. Since more than one fuzzy set can be applied, whether or not there is another fuzzy set name is decided at a step 55. In the presence of another fuzzy set name, the processing steps 53 et seq. are repeated. On the other hand, in the absence of another fuzzy set name, the fuzzy reasoning initialization processing of the unit 11 is ended.

FIG. 4 shows an example of the integrated fuzzy reasoning information 15. As stated before, the information 15 is such that the fuzzy set information items in FIG. 3(*a*) are linked to the fuzzy rule group information items in FIG. 2(*a*), using the proposition Nos. 31 as keys.

The fuzzy reasoning execution unit 16 executes the fuzzy reasoning on the basis of the fact information indicated in the condition frame 12 and the table shown in FIG. 4, and it delivers the reasoned result to the conclusion frame 17 ( The fact information is the fact values of the subjects 32 which are contained in the proposition Nos. 31 used in the condition part expressions 22).

The fuzzy reasoning which is executed on the basis of the table in FIG. 4 by the fuzzy reasoning execution unit 16, includes the following practicable steps:

(1) Computation of the grade of membership of each condition part:

First, the grades of membership are obtained in such a way that fact values are applied to membership functions designated for the propositions M1, M4; M2, M5; and M3 of the condition part expressions 22 of respective rules R1, R2 and R3. In this example, the fact values of the propositions M1–M3 concern the subject S1, and those of the propositions M4–M5 concern the subject S2. As exemplified in FIG. 7, it is assumed that, regarding the rule Ri, a membership grade of 0.4 has been obtained from the membership function of the proposition M1, while a membership grade of 0.6 has been obtained from the membership function of the proposition M4. Then, since the propositions M1 and M4 are subjected to AND according to the rule R, the smaller value 0.4 is found as the grade of membership of the condition part corresponding to the rule R1. It is also assumed that, regarding the rule R2, a membership grade of 0.9 has been obtained from the membership function of the proposition M2, while a membership grade of 0.8 has been obtained from the membership function of the proposition M5. Then, since the propositions M2 and M5 are subjected to OR according to the rule R2, the greater value 0.9 is found as the grade of membership of the condition part corresponding to the rule R2. Similarly, it is assumed that, regarding the rule R3, membership grades of 0.3 and 0.8 have been respectively obtained for the propositions M3 and M5, so the grade of membership of a condition part corresponding to the rule R3 becomes 0.3. By the way, in a case where the condition part contains only one proposition, a membership grade afforded by the membership function of the proposition becomes simply the grade of membership of the condition part as it is.

Figure 7:
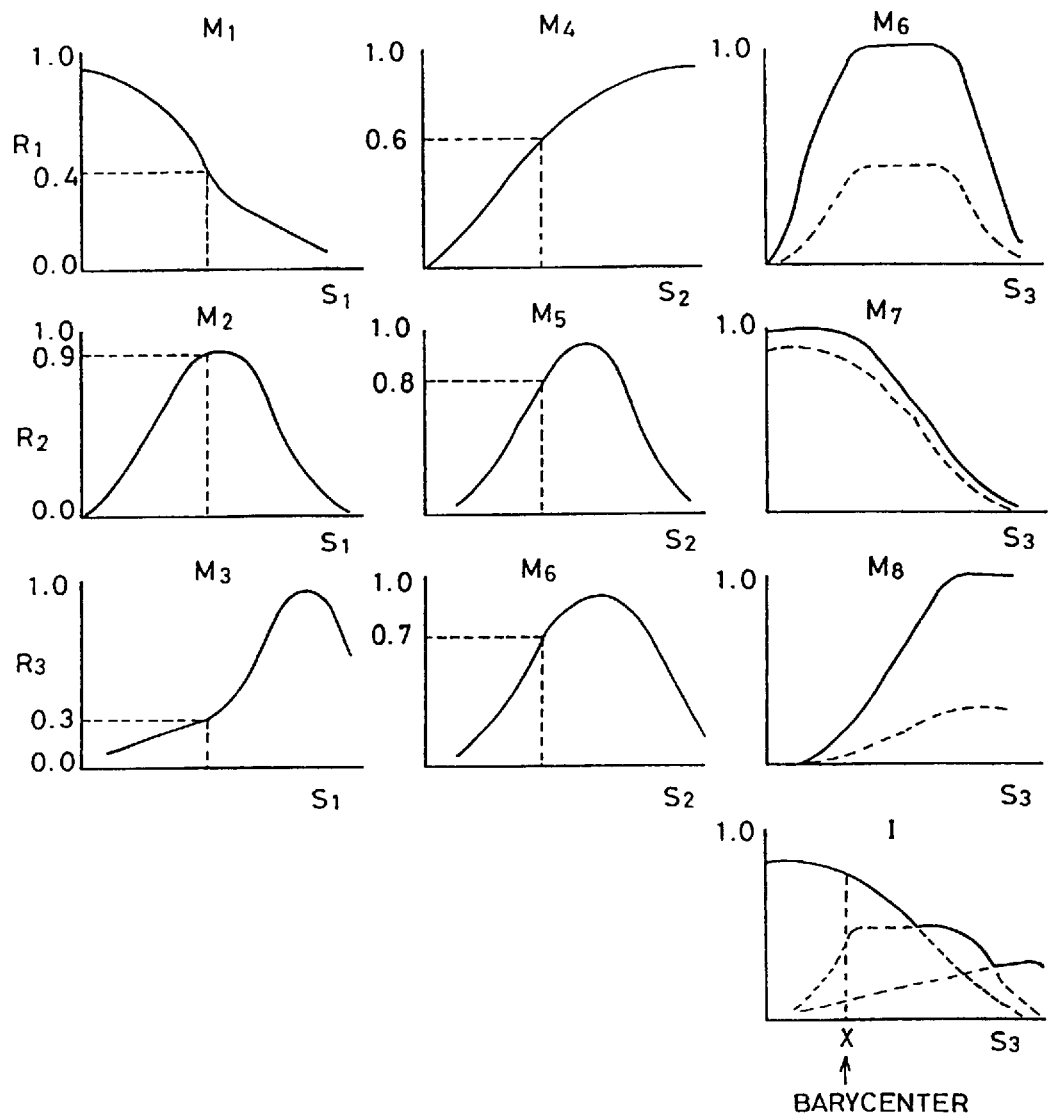
FIG. 7 shows graphs illustrative of membership functions which are used for explaining the practicable steps of fuzzy reasoning.

For the sake of brevity of explanation, the types of the membership functions shown in FIG. 7 do not correspond to those shown in FIG. 6.

(2) Computation of the grade of membership of each fuzzy rule:

In this processing, conclusion parts corresponding to the rules R1–R3 are weighted by the membership grades of the condition parts. More specifically, regarding the rule R1, the membership function of the conclusion part expression M6 is weighted by the membership grade a (0.4) of the condition part found at the step (1), as described below. In general, letting a denote the membership grade of the condition part and F(x) denote the membership function of the proposition of the conclusion part, the membership grade of the fuzzy rule is given by the following formula:

$$\text{(Membership grade of Fuzzy rule)} = \alpha \times F(x) \qquad \text{(i)}$$

This formula is sometimes substituted by:

$$\text{(Membership grade of Fuzzy rule)} = \text{Min}(\alpha, F(x)) \qquad \text{(ii)}$$

According to Formula (i), as shown in FIG. 7, the membership functions (indicated by solid lines) of the conclusion part propositions M6, M7 and M8 of the rules R1, R2 and R3 are respectively weighted by the condition part membership grades 0.4, 0.9 and 0.3 into the curves of the fuzzy-rule membership grades (indicated by broken lines).

(3) Computation of the colligated grade of membership:

The fuzzy-rule membership grades found for the individual rules at the step (2), are colligated.

As one method of the colligation, when the fuzzy-rule membership grades are respectively denoted by r1, r2, . . . and rn, the greatest value of them is set as the colligated membership grade of the pertinent subject. That is, the colligated grade of membership is given by the following formula:

$$\text{(Colligated grade of Membership)} = \text{Max}(r1, r2, \ldots, rn) \qquad \text{(iii)}$$

In the example of FIG. 7, as shown by a graph I at the right lower part of the drawing, a curve indicated by a solid line is gained as the membership function of the colligated membership grade.

(4) Computation of a representative value:

The conclusion resulting from the fuzzy reasoning is expressed by the membership function, and is therefore ambiguous. This conclusion is clarified into a so called representative value. Although the representative value is computed in various ways, the barycentric method in which the barycenter of the membership function is decided as the representative value is employed in this embodiment. More specifically, according to the barycentric method, that section of the domain of the membership function which ranges from the minimum value to the maximum value is divided by a predetermined interval, and the membership grades of the individual dividing points are considered as weights acting on the respective points. On this occasion, the point at which the axis of abscissas is balanced by the weights is the barycenter. In the example of FIG. 7, the value $\underline{x}$ of the barycentric point in the graph I is the representative value thus found.

Meanwhile, in the case where only the fuzzy set information is utilized on the basis of the production rules, the fuzzy set to be used and the membership functions of its propositions to he used are set in the condition frame 12 together with the fact values by the production system. The fuzzy reasoning execution unit 16 executes the computation processing for the membership functions on the basis of the fact information items, the name of the fuzzy set, and the identifiers of the propositions designated in the condition frame 12 as listed in the table of FIG. 3(a), and it supplies the conclusion frame 17 with the grade of membership as a reasoned result.

The embodiment thus far described can be implemented by a computer system which comprises a central processing unit having a main memory, an external memory, and an input/output unit. The condition frame 12, file 13, file 14, integrated fuzzy-reasoning information 15 and conclusion frame 17 can be stored in the main memory or the external memory. In addition, the processes of the fuzzy reasoning initialization unit 11 and the fuzzy reasoning execution unit 16 can be executed by programs stored in the main memory. The fuzzy rule group to be applied and the fuzzy set(s) to be applied can be designated through the input/output unit which includes, for example, a keyboard and a display, whereby the condition frame 12 can be generated.

According to the present invention, it is possible to build a fuzzy reasoning system which conforms to situations and to build a reasoning system with which only membership functions can be utilized on the basis of production rules.

What claimed is:

1. A fuzzy reasoning method for executing a fuzzy reasoning in a fuzzy reasoning application, comprising the steps of:

preparing a fuzzy rule group, and also preparing a plurality of fuzzy sets which correspond to said fuzzy rule group, for said fuzzy reasoning application, each of the fuzzy sets including a plurality of membership functions, dynamically selecting at least one of said fuzzy sets at the time of execution of the fuzzy reasoning in response to information existing at that time, combining the selected fuzzy set with said fuzzy rule group, and executing said fuzzy reasoning by using the combined fuzzy rule group and fuzzy set.

2. A fuzzy reasoning method as defined in claim 1, further comprising the step of obtaining a grade of membership of a selected one of said membership functions.

3. A fuzzy reasoning method for executing a fuzzy reasoning in a fuzzy reasoning application, comprising the steps of:

preparing a plurality of fuzzy rule groups, and also preparing a plurality of fuzzy sets which correspond to the fuzzy rule groups for said fuzzy reasoning application, each of the fuzzy sets including a plurality of membership functions, dynamically selecting at least one of the fuzzy rule groups and one of the fuzzy sets at the time of executing the fuzzy reasoning in response to information existing at that time, combining the selected fuzzy set with the selected fuzzy rule group, and executing said fuzzy reasoning by using the combined fuzzy rule group and fuzzy set.

4. A fuzzy reasoning method as defined in claim 3 further the step of obtaining a grade of membership of a selected one of said membership functions.

5. A fuzzy reasoning system for executing a fuzzy reasoning, said fuzzy reasoning system comprising:

means for storing a plurality of fuzzy rule groups, means for storing a plurality of fuzzy sets, each of which has a plurality of membership functions, means for designating any of said plurality of fuzzy rule groups and at least one of said plurality of fuzzy sets, means for storing a condition frame which includes the designated fuzzy group and fuzzy set as well as actual values applied to fuzzy rules of said designated fuzzy rule group, means for combining said designated fuzzy rule group and fuzzy set, on the basis of said condition frame, fuzzy reasoning execution means for executing the fuzzy reasoning which utilizes the combined fuzzy rule group and fuzzy set on the basis of said actual values, and means for storing a result derived from the execution of said fuzzy reasoning execution means.

6. A fuzzy reasoning system as defined in claim 5, further comprising means for storing production rules by which contents to be designated in said condition frame are determiuned, and means for executing said production rules.

* * * * *